United States Patent [19]
Harrison et al.

[11] Patent Number: 6,143,852
[45] Date of Patent: Nov. 7, 2000

[54] COPOLYMERS FOR RAPID PROTOTYPING

[75] Inventors: David Bryan Harrison, Leverkusen; Wolfgang Podszun, Cologne, both of Germany

[73] Assignee: Bayer Aktiengesellschaft, Leverkusen, Germany

[21] Appl. No.: 09/418,298

[22] Filed: Oct. 14, 1999

[30] Foreign Application Priority Data

Oct. 23, 1998 [DE] Germany .......................... 198 48 896

[51] Int. Cl.$^7$ .................................................. C08F 220/10
[52] U.S. Cl. ...................... 526/328.5; 526/319; 526/328
[58] Field of Search ..................................... 526/319, 328, 526/328.5

[56] References Cited

U.S. PATENT DOCUMENTS 4,614,708  9/1986  Timmerman et al. .................. 430/517

FOREIGN PATENT DOCUMENTS

| 0 584 407 | 4/1998 | European Pat. Off. . |
| 0 610 522 | 4/1999 | European Pat. Off. . |
| 19701078 | 2/1998 | Germany . |

OTHER PUBLICATIONS

A. Gebhardt, "Rapid Prototyping", Carl Hanser Verlag, Munich, Vienna (month unavailable) 1996, pp. 115–116, Selektives LASER–Sinter (SLS).

C.E. Schildknecht, editor, "Polymer Processes", Interscience Publishers, New York, (month unavailable) 1956, pp. 69–109, Polymerizations in Suspension.

*Primary Examiner*—Helen L. Pezzuto
*Attorney, Agent, or Firm*—Joseph C. Gil; Aron Preis

[57] ABSTRACT

This invention relates to spherical methyl methacrylate copolymers with an average particle size of 6 to 50 $\mu$m and a narrow particle size distribution, and to a method of producing them. The invention further relates to the use of these spherical copolymers for the production of 3-D models by laser sintering.

6 Claims, 1 Drawing Sheet

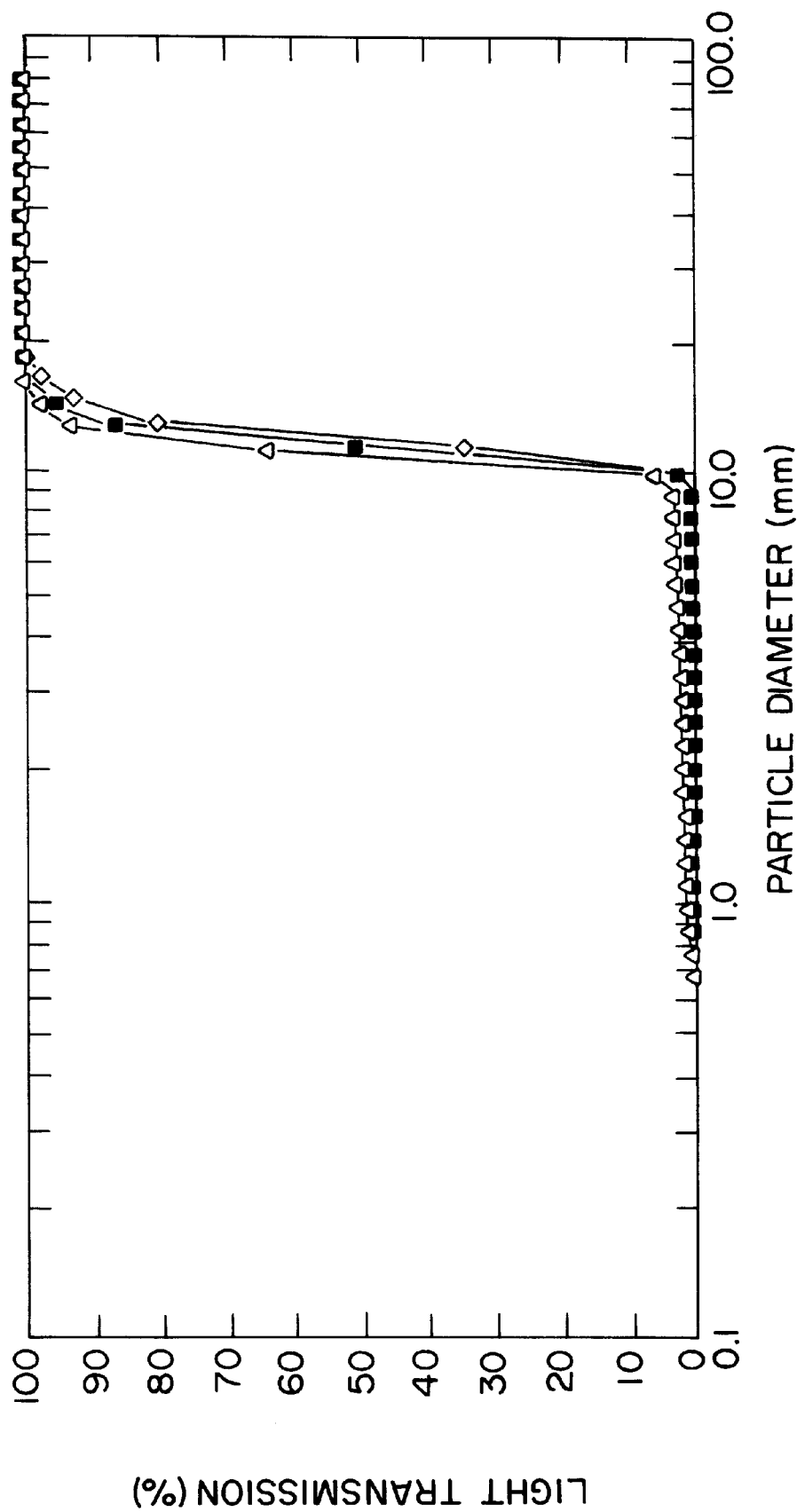

COPOLYMERS FOR RAPID PROTOTYPING

This invention relates to spherical methyl methacrylate copolymers with an average particle size of 6 to 50 μm and a narrow particle size distribution, and to a method of producing them. The invention further relates to the use of these spherical copolymers for the production of 3-D models by laser sintering.

The term "laser sintering" denotes a rapid prototyping method in which poured assemblages of defined powdered materials are heated and sintered between defined coordinates by the action of a laser beam, which is preferably controlled by a program. The term "rapid prototyping" is employed to summarise the computer-controlled, additive, automated methods of constructing 3-D models which are currently known.

A method such as this is described in Patent Specification DE-C 19 701 078, for example. In this method, low-melting metals are sintered as part of a process for producing three-dimensional models using a rapid prototyping installation. Low-melting metals or metal alloys, which have a melting point below 200° C., are used in the form of metal powders or metal foils which contain neither plastics material binders nor metallic binders. The energy of the laser beam used is adjusted according to the melting point of the metals or metal alloys employed.

The use of plastics powders for laser sintering is also known (A. Gebhardt: "Rapid Prototyping", Carl Hanser Verlag, Munich, Vienna 1996, pages 115–116). This method is employed both for the production of plastics models and for the manufacture of positive preforms for ceramic casting moulds. On account of its good optical and mechanical properties, polymethacrylate is a plastics material which is well suited to laser sintering.

One disadvantage of known plastics powders is their poor flowability. This is a disadvantage which can only be lessened in part by the use of flow enhancers. Transport within the laser sintering installation is made difficult due to this poor flow behavior.

The following additional problems occur during the production of positive preforms for ceramics. It is possible to sinter ground polymers, e.g. polystyrene, but the surface quality of the preform is not completely satisfactory. The polymer preform is subsequently surrounded by ceramic material, which is fired at elevated temperature to impart strength. In this procedure, the polymer material is volatilised. Complete volatilisation is desirable. However, most polymer powders cannot be removed on firing without leaving a residue, on account of the use of flow enhancers.

These disadvantages can be avoided by the use of spherical polymers beads for laser sintering.

Homopolymers, such as polymethyl methacrylate for example, can be produced by dispersion polymerisation as spherical polymers beads with particle sizes from 0.5 to 10 μm. One suitable method is described in EP-A 610 522, for example. In dispersion polymerisation, a solvent is used in which the monomers which are employed are soluble but in which the polymer formed is insoluble. In general, dispersion polymerisation provides high yields of spherical polymers beads with a narrow particle size distribution and with a low molecular weight which is suitable for laser sintering. It has been shown, however, that it is difficult to produce larger particles. A further distinguishing feature of this process is that the particle size distribution becomes significantly broader with increasing particle size.

It is known from EP-A 610 522 that the dispersion polymerisation of methyl methacrylate with styrene as a comonomer results in smaller pearls with a significantly broader particle size distribution than the product obtained from the homopolymerisation of methyl methacrylate. According to U.S. Pat. No. 4,614,708, spherical copolymers of methyl methacrylate and other methacrylate esters could only be produced up to a particle size of 5 μm by dispersion polymerisation. Polymer beads with a particle size <5 μm are less suitable for laser sintering, on account of their poor flowability and their pronounced tendency to form dust. According to EP-A 584 407, spherical polymer beads which comprise methyl methacrylate units and which have a particle size of 6 μm and a narrow particle size distribution can be produced by the dispersion polymerisation of methyl methacrylate with acrylic acid or methacrylic acid as a comonomer. However, these products are difficult to melt and therefore are likewise only of limited suitability for laser sintering.

Pearl polymers with a particle size of about 10 to 200 μm can be obtained by suspension polymerisation. The term "suspension polymerisation" is to be understood to mean a method in which a monomer, or a mixture which contains a monomer, which contains an initiator which is soluble in the monomer, is broken down into the form of droplets, possibly in admixture with small, solid particles, in a phase which is substantially immiscible with the monomer and which contains a dispersing agent, and is cured by increasing the temperature whilst stirring. Further details of suspension polymerisation are given in C. E. Schildknecht (Editor): "Polymer Processes", Interscience Publishers. New York, 1956 pages 69–109, for example.

One disadvantage of suspension polymerisation is the broad particle size distribution of the polymer beads produced. During laser sintering, a broad particle size distribution can result in poor reproducibility of quality and in inhomogenieities. The beads therefore have to be sieved after polymerisation in order to obtain a sieved fraction suitable for laser sintering. A further disadvantage of suspension polymerisation is the necessity of using considerable amounts of molecular weight regulators in order to obtain polymers with a sufficient low molecular weight suitable for laser sintering. The use of such large amounts of molecular weight regulators has a negative effect both on the rate and yield of the polymerisation process.

BRIEF DESCRIPTION OF THE DRAWINGS

FIG. 1 depicts, on a semi log scale, the relationship between the light transmission (%) and particle diameter (mm).

It has now been found that spherical polymer beads which have the requisite particle size for laser sintering and which have a narrow particle size distribution are obtained by the dispersion copolymerization of methyl methacrylatae with at least one comonomer selected from the group consisting of $C_{2-10}$-alkylmethacrylate, optionally with at least one silane.

The average particle size (Ø) and the particle size distribution are determined by means of optical analysis. The ratio of the 90% value (Ø(90)) to the 10% value (Ø(10)) of the distribution by volume is used to define the breadth of the particle size distribution of the spherical copolymers produced. Narrow particle size distributions in the sense of the present invention mean that Ø(90)/Ø(10) is <2.0, and preferably that Ø(90)/Ø(10) is <1.5.

The present invention relates to spherical methyl methacrylate copolymers, which have an average particle size of 6 to 50 μm, which have a narrow particle size distribution as defined above, and which comprise, with respect to the weight of the copolymer,
a) 90 to 50% by weight, preferably 90 to 60% by weight, most preferably 80 to 60% by weight, of methyl methacrylate units, and
b) 10 to 50% by weight, preferably 10 to 40% by weight, most preferably 20 to 40% by weight, of at least one $C_2$ to $C_{10}$ alkyl methacrylate ester unit.

The present invention further relates to a method of producing the methyl methacrylate copolymers according to the invention, wherein a monomer mixture consisting of:
a) 90 to 50% by weight, preferably 90 to 60% by weight, most preferably 80 to 60% by weight, of methyl methacrylate, and
b) 10 to 50% by weight, preferably 10 to 40% by weight, most preferably 20 to 40% by weight, of at least one $C_2$ to $C_{10}$ alklyl methacrylate,
is polymerised by dispersion polymerisation using an initiator.

The present invention also relates to the use of the copolymers according to the invention as a sintering material for laser sintering.

$C_2$ to $C_{10}$ esters of methacrylic acid, or silane monomers according to EP-A 417 539, can be used according to the invention as methacrylate esters comprising a $C_2$ to $C_{10}$ alkyl radical. $C_2$ to $C_8$ esters of methacrylic acid are preferred; $C_2$ to $C_4$ esters of methacrylic acid are particularly preferred. Suitable examples include ethyl methacrylate, n-propyl methacrylate, iso-propyl methacrylate, n-butyl methacrylate, iso-butyl methacrylate, n-hexyl methacrylate, 2-ethylhexyl methacrylate, n-octyl methacrylate, n-decyl methacrylate, methoxyethyl methacrylate, methoxybutyl methacrylate, triethylene glycol monomethacrylate, methacryloxypropyl trimethoxysilane and methacryloxypropyl triethoxysilane. Ethyl methacrylate, n-propyl methacrylate, iso-propyl methacrylate, n-butyl methacrylate and iso-butyl methacrylate are preferred.

In the method according to the invention for the production of methyl methacrylate copolymers, the aforementioned monomers are copolymerised in a solvent, using an initiator.

The suitable solvents include non-aqueous solvents, such as dioxane, acetone, acetonitrile, dimethylformamide and alcohols. Low molecular weight alcohols are preferred, particularly methanol, ethanol, n-propanol, iso-propanol, n-butanol, iso-butanol and tert.-butanol. Mixtures of different solvents are also very suitable, particularly mixtures of different alcohols. The alcohols may also contain up to 50% by weight of water, preferably up to 25% by weight of water. When mixtures of solvents are used, nonpolar solvents, particularly hydrocarbons such as hexane and heptane, can be used in conjunction in proportions of up to 50% b, weight.

The ratio of monomer mixture to solvent ranges from 1:1 to 1:20. preferably from 1:3 to 1:10.

The method according to the invention is preferably carried out in the presence of a high molecular weight dispersing agent (average molecular weight (Mw) of 10,000 to 1,000,000 g/mol).

Natural and synthetic macromolecular compounds which are soluble in the solvent used are suitable as high molecular weight dispersing agents. Examples include cellulose derivatives, such as methyl cellulose, ethyl cellulose or hydroxypropyl cellulose, polyvinyl acetate, partially saponified polyvinyl acetate, polyvinylpyrrolidone, and copolymers of vinylpyrrolidone and vinyl acetate, as well as copolymers of styrene and maleic anhydride. Polyvinylpyrrolidone is preferred. The content of high molecular weight dispersing agent is 0.1 to 20% by weight, preferably 0.2 to 10% by weight, with respect to the solvent.

In addition to dispersing agents, ionic and non-ionic surfactants can also be used. Examples of suitable surfactants include sodium sulphosucciniate, methyltricaprylylammonium chloride, or ethoxylated nonylphenol. Surfactants can be used in amounts of 0.1 to 2% by weight with respect to the solvent.

The initiators which are suitable for the method according to the invention are compounds which form free radicals when the temperature is increased. Examples thereof include: peroxy compounds such as dibenzoyl peroxide, dilauryl peroxide, bis-p-chlorobenzoyl) peroxide, dicyclohexyl peroxydicarbonate and tert.-amylperoxy-2-ethylhexane, as well as azo compounds such as 2,2'-azobis (isobutyronitrile) and 2,2'-azobis(2-methylisobutyronitrile). Provided that the polar medium has a content of at least 5% water by weight, sodium peroxydisulphate is also suitable.

Aliphatic peroxyesters corresponding to formulae I, II or III are also very suitable:

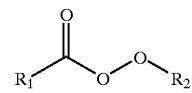

formula I

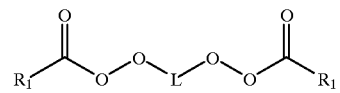

formula II

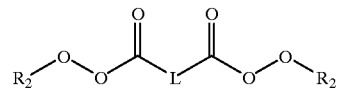

formula III wherein
$R_1$ is an alkyl radical or a cycloalkyl radical comprising 2 to 20 C atoms,
$R_2$ is a branched alkyl radical comprising 4 to 12 C atoms, and
L is an alkylene radical or a cycloalkylene radical comprising 2 to 20 C atoms.

Examples of aliphatic peroxyesters corresponding to formula I include tert.-butyl peroxyacetate, tert.-butyl peroxyisobutyrate, tert.-butyl peroxypivalate, tert.-butyl peroxyoctoate, tert.-butyl peroxy-2-ethylhexanonate, tert.-butyl peroxyneodecanoate, tert.-amyl peroxypivalate, tert.-amyl peroxyoctoate, tert.-amyl peroxy-2-ethyl-hexanonate and tert.-amyl peroxyneodecanoate.

Examples of aliphatic peroxyesters corresponding to formula II include 2,5-bis(2-ethyl-hexanoylperoxy)-2,5-dimethylhexane, 2,5-dipivaloyl-2,5-dimethylhexane and 2,5-bi s(2-neodecanoylperoxy)-2,5-dimethylhexane.

Examples of aliphatic peroxyesters corresponding to formula III include di-tert.-butyl peroxyazelate and di-tert.-amyl peroxyazelate.

The initiators are generally used in amounts of 0.05 to 6.0% by weight, preferably 0.2 to 4.0% by weight, with respect to the monomer mixture.

The polymerisation temperature depends on the decomposition temperature of the initiator former and on the boiling temperature of the solvent, and typically falls within the range from 50 to 150° C., preferably 55 to 120° C. Polymerisation is advantageously conducted at the boiling temperature of the solvent, and stirring is advantageously effected during polymerisation. The time of polymerisation generally amounts to several hours, e.g. 2 to 30 hours.

The copolymer according to the invention can be isolated from the reaction mixture by filtration, or it can be isolated particularly advantageously by sedimentation by means of a centrifuge or a decanting device.

COMPARATIVE EXAMPLES 1–8

2340 g methanol, 180 g polyvinylpyrrolidonc K 30 (Mw= 55,000 g/mol)and 300 g of a monomer mixture consisting of methyl methacrylate and optionally of a different comonomer (Table 1) were mixed to form a homogeneous solution in a 4 liter reactor fitted with a mesh stirrer. This solution was heated to 55° C. under nitrogen, over a period of one hour and at a stirring speed of 100 rpm, and a solution of 6 g 2,2'-azo-bis(isobutyronitrile) in 165 g methanol was added to the reactor. The polymerisation mixture w as stirred for a further 20 hours at 55° C. and 100 rpm. The final polymer dispersion was subsequently cooled to room temperature and the polymer beads were isolated by sedimentation. The particle sizes of the polymer beads obtained are listed in Table 1.

TABLE 1

Methyl methacrylate copolymers used as comparative examples

| Comparative example | MMA [% by weight] | Comonomer | Comonomer [% by weight] | Ø [μm] | Ø(10) [μm] | Ø(90) [μm] | Ø(90)/ Ø(10) |
|---|---|---|---|---|---|---|---|
| 1 | 100 | — | 0 | 4.37 | 4.03 | 4.78 | 1.19 |
| 2 | 95 | EtMA | 5 | 4.36 | 4.02 | 4.77 | 1.19 |
| 3 | 95 | n-BuMA | 5 | 5.40 | 4.76 | 6.04 | 1.26 |
| 4 | 95 | EtHexMA | 5 | 4.71 | 4.16 | 4.86 | 1.17 |
| 5 | 95 | DodMA | 5 | 4.96 | 4.46 | 5.36 | 1.20 |
| 6 | 95 | StMA | 5 | 3.71 | 3.38 | 3.94 | 1.17 |
| 7 | 75 | DodMA | 25 | 3.08 | 2.73 | 3.40 | 1.24 |
| 8 | 75 | StMA | 25 | 2.51 | 2.06 | 3.13 | 1.52 |

EtMA=ethyl methacrylate; n-BuMA=n-butyl methacrylate; EtHexMA=ethyl-hexyl methacrylate; DodMA=dodecyl methacrylate; StMA=stearyl methacrylate

EXAMPLES 1–12

Polymerisation and work-up were conducted in the same manner as in the comparative examples. The monomer mixtures used and the particle sizes of the polymer beads obtained are listed in Table 2.

TABLE 2

Methyl methacrylate copolymers according to the invention

| Examples | MMA [% by weight] | Comonomer | [% by weight] | Ø [μm] | Ø(10) [μm] | Ø(90) [μm] | Ø(90)/ Ø(10) |
|---|---|---|---|---|---|---|---|
| 1 | 80 | EtMA | 20 | 6.64 | 6.06 | 6.91 | 1.14 |
| 2 | 75 | EtMA | 25 | 8.48 | 7.62 | 9.14 | 1.20 |
| 3 | 70 | EtMA | 30 | 12.24 | 11.37 | 13.42 | 1.18 |
| 5 | 80 | n-BuMA | 20 | 8.54 | 7.79 | 9.10 | 1.17 |
| 6 | 75 | n-BuMA | 25 | 10.12 | 9.24 | 11.27 | 1.22 |
| 7 | 70 | n-BuMA | 30 | 12.03 | 10.31 | 14.05 | 1.36 |
| 8 | 60 | n-BuMA | 40 | 25.49 | 20.37 | 28.97 | 1.42 |
| 9 | 50 | n-BuMA | 50 | 35.77 | 25.11 | 49.54 | 1.97 |
| 10 | 80 | EtHexMA | 20 | 7.59 | 6.84 | 7.78 | 1.14 |
| 11 | 75 | EtHexMA | 25 | 6.64 | 6.10 | 7.25 | 1.19 |
| 12 | 70 | EtHexMA | 30 | 6.47 | 5.85 | 6.95 | 1.19 |

EtMA=ethyl methacrylate; n-BuMA=n-butyl methacrylate; EtHexMA=ethyl-hexyl methacrylate Determination of the particle diameter and particle size distribution of the products obtained in the examples and in the comparative examples was effected using a SIS optical analysis instrument supplied by Soft Imaging Systems GmbH. Water was used as the dispersion medium. Measurements were made in a dark field at a magnification of 1180, with the focusing being set to the largest final particle. The projection area was employed as one particle characteristic, and was calculated from the area of the sphere of equivalent diameter. The shape factor was measured as a further parameter. Aggregatesm, etc., could be distinguished during evaluation by means of this shape factor. At least 2000 particles per sample were measured, in order to obtain statistically meaningful results. The average particle diameter (Ø), as well as the 10% value (Ø(10)) and the 90% value (Ø(90)) of the distribution by volume, were determined from the measured distribution of particle diameters. The result of example 7 is illustrated in FIG. 1. The figure describes the relationship between the measured light transmission and the size of particles.

What is claimed is:

1. Spherical methyl methacrylate copolymers, the structural units of which includes
    a) 90 to 50 percent of methyl methacrylate, and
    b) 10 to 50 percent of at least one $C_{2-10}$-alkyl methacrylate, said percent, both occurrences, being relative to the weight of said copolymer, said copolymer being in the form of substantially spherical pellets having a volume average particle size of 6 to 50 microns, and a breadth of the particle size distribution of less than 2.0.

2. The spherical methyl methacrylate copolymers according to claim 1, wherein said a) is present in an amount of 90 to 60 percent and said b) is present in an amount of 10 to 40 percent.

3. The spherical methyl methacrylate copolymers according to claim 1, wherein said a) is present in an amount of 80 to 60 percent and said b) is present in an amount of 20 to 40 percent.

4. The spherical methyl methacrylate copolymers according to claim 1, wherein said breadth of the particle size distribution is less than 1.5.

5. A method of using the copolymer of claim 1 in producing a 3-D model comprising laser sintering.

6. The spherical methacrylate copolymer of claim 1 prepared by polymerizing by dispersion in a solvent and in the presence of an initiator a monomer mixture containing a) 90 to 50 percent of methyl methacrylate, and b) 10 to 50 percent of at least one $C_{2-10}$-alkyl methacrylate, said percent, both occurrences being relative to the weight of said mixture.

* * * * *